United States Patent [19]

Momiyama et al.

[11] 3,942,934
[45] Mar. 9, 1976

[54] MOLD ASSEMBLY FOR USE IN PACKAGING MACHINE

[75] Inventors: Takenori Momiyama; Keiiti Mizutani; Masakazu Ōi, all of Osaka; Shinji Hanatani, Hyogo, all of Japan

[73] Assignee: Takeda Chemical Industries, Ltd., Osaka, Japan

[22] Filed: Oct. 11, 1974

[21] Appl. No.: 514,254

[30] Foreign Application Priority Data
Oct. 19, 1973  Japan.............................. 48-118083
June 20, 1974  Japan.............................. 49-70932

[52] U.S. Cl.............. 425/342; 425/387 R; 425/388; 264/89
[51] Int. Cl.² ........................................... B29C 3/02
[58] Field of Search................ 425/342, 387 R, 388; 264/89

[56] References Cited
UNITED STATES PATENTS

| 3,126,580 | 3/1964 | Paschke | 425/388 |
| 3,181,202 | 5/1965 | Martelli et al. | 425/388 X |
| 3,244,779 | 4/1966 | Levey et al. | 264/84 |
| 3,805,486 | 4/1974 | Mahaffy et al. | 425/388 X |

*Primary Examiner*—R. J. Shore
*Attorney, Agent, or Firm*—Wenderoth, Lind & Ponack

[57] ABSTRACT

A mold assembly for use in a packaging machine for making a blistered package, which forms a plurality of blisters in a web of thermoplastic resin film forming a part of the blistered package. The mold assembly comprises a preforming structural body formed with a plurality of preforming molds and a finishing structural body formed with the corresponding number of finishing molds arranged in the same pattern as the preforming molds. The thermoplastic resin web is first subjected to a preforming process with the preforming structural body and then to a final forming process with the finishing structural body thereby to avoid excessive and quick reduction of the wall thickness which may otherwise be observable in any of the finally formed blisters. A method for this purpose is also disclosed.

16 Claims, 6 Drawing Figures

MOLD ASSEMBLY FOR USE IN PACKAGING MACHINE

The present invention relates in general to a packaging machine for making a blistered package and, more particularly, to a mold assembly used in the packaging machine for forming a plurality of shaped shells or blisters in a web of thermoplastic resin film.

The blistered package hereinabove and hereinafter referred to is known as a press-through package which comprises a web of thermoplastic resin film formed with a plurality of recesses, which may be referred to as shells or blisters, for accommodating therein the corresponding number of articles or products to be packed, and a covering lid, for example, an aluminum foil, bonded or heat-sealed to the thermoplastic resin web with the articles or products housed in said recesses. Release of one of the articles or products packed in the above manner can be achieved merely by pushing the blister in the thermoplastic resin web by the application of finger pressure to cause a relevant portion of the covering lid to break. This packaging technique is largely employed in the pharmaceutical industry for packaging pills, tablets, medicament-containing capsules or any other solid drugs and articles or products protected in blistered packages are available everywhere.

Conventional packaging machines for making the blistered packages are broadly classified into two types depending upon the blister forming technique; one being a continuous type and the other being an intermittent type.

In the conventional packaging machine of the continuous type, a mold assembly for forming the blisters in the thermoplastic resin web comprises a pair of female and male drums supported for synchronous rotation at the same peripheral speed; the female drum having the peripheral surface formed with a plurality of radially inwardly recessed female molds and the male drum having the peripheral surface formed with the corresponding number of radially outwardly protruding male drums, and a heating unit for heating either the female drum or the male drum. A web of thermoplastic resin film is adapted to travel through between the female and male drums and, as the thermoplastic resin web passes therethrough, it is softened in contact with the heated one of the female and male drums and subsequently molded to form the finally shaped blisters in the thermoplastic resin web.

In the conventional packaging machine of the intermittent type, the mold assembly comprises a pair of female and male plates supported for relative movement in a direction close to and away from each other; the female plate having one surface formed with a plurality of inwardly recessed female molds and the male plate having one surface formed with the corresponding number of outwardly protruding male molds engageable in said respective female molds, and a heating unit for heating either the female plate or the male plate. A web of thermoplastic resin film is adapted to intermittently travel through between said female and male plates and, each time the thermoplastic resin web is held standstill, the female and male plates are relatively moved close to each other with the female molds receiving the associated male molds through the thermoplastic resin web, thereby forming the finally shaped blisters in the thermoplastic resin web.

The conventional packaging machines of both types have such a common feature that blister forming is performed in a single stage. In other words, in order to form the blisters in the thermoplastic resin web, the only pair of female and male molds are employed.

One of the most advanced packaging machines irrespective of the type described above, is capable of forming a blister having the minimum thickness within the range of 50 to 40 $\mu$ when the thermoplastic resin web having a thickness within the range of 250 to 200 $\mu$ has been used. In other words, in order to form the blisters each having a predetermined or desired wall thickness, a web of thermoplastic resin film having a relatively great thickness has to be used. The thinner the thermoplastic resin web is, the smaller the wall thickness of any of the resultant blisters and it often provides an undesirable result. If the wall thickness of any of the blisters is excessively small, not only the blisters can easily be broken, for example, during transportation of the blistered package, but also some of the products protected within the corresponding blisters are adversely affected by moisture entering the blisters.

Accordingly, an essential object of the present is to provide an improved mold assembly useable in the packaging machine of the type referred to above, which can form in a web of thermoplastic resin film of 150 to 200 $\mu$ blisters each having a wall thickness within the range available by the conventional packaging machine.

Another object of the present invention is to provide an improved mold assembly useale in the packaging machine of the type referred to above, which does not, but not exclusively, require the use of a web of thermoplastic resin film having a relatively great thickness with no substantial reduction of the wall thickness of each resultant blister below the optimum value.

A further object of the present invention is to provide an improved mold assembly useable in the packaging machine of the type referred to above, which comprises a preforming mold and a finishing mold to effect the blister forming operation in two stages thereby obtaining blisters of substantially uniform wall thickness.

It is a related object of the present invention to provide a molding method for forming the blisters in the thermoplastic resin web by the use of the mold assembly herein disclosed.

An essential feature of the present invention resides in the employment of a double stage, blister forming method which comprises a step of preforming blisters in a web of thermoplastic resin film by the effect of air-pressure differential while said thermoplastic resin web is heated and is in a soft, pliable condition and a step of finally forming the preformed blisters into a desired or predetermined shape by the effect of air-pressure differential while said thermoplastic resin web is again heated and, therefore, in a soft, pliable condition.

To this end, according to one preferred embodiment of the present invention, there is provided a mold assembly which comprises a preforming drum having the outer peripheral surface formed with a plurality of radially inwardly recessed molds arranged in a predetermined pattern and a finishing drum having the outer peripheral surface formed with radially inwardly recessed molds corresponding in number to the molds in the preforming drum and arranged in the same pattern as the molds in the preforming drum. These preforming and finishing drums are supported in spaced relation to each other for synchronous rotation such that each of the preformed blisters in the thermoplastic resin web can, after the thermoplastic resin web has continuously been moved past the preforming drum and subsequently contacts the finishing drum, automatically engage in the respective molds in the finishing drum.

Separate heating units are also employed in association with the respective preforming and finishing drums for heating the thermoplastic resin web to a soft, pliable condition.

On the other hand, according to another preferred embodiment of the present invention, the mold assembly comprises a preforming, plate-shaped block having one surface formed with a plurality of inwardly recessed molds arranged in a predetermined pattern and a finishing, plate-shaped block having one surface formed with inwardly recessed molds corresponding in number to the molds in the preforming block and arranged in the same pattern as the molds in the preforming block. These preforming and finishing blocks are arranged side by side adjacent to each other and are respectively operatively associated with pressure plates each adapted to clamp the thermoplastic resin web on both sides thereof in cooperation with the preforming or finishing blocks. The thermoplastic resin web is adapted to intermittently travel through gaps between the preforming block and the pressure plate positioned thereabove and between the finishing block and the pressure plate positioned thereabove and, each time the thermoplastic resin web is held standstill, the preforming and finishing blocks and the pressure plates respectively associated therewith undergo relative movement in a direction close to each other to clamp the thermoplastic resin web on both sides thereof to effect the blister preforming and finishing operations, respectively.

These and other objects and features of the present invention will readily become clear from the following description taken in conjunction with preferred embodiments thereof with reference to the accompanying drawings, in which;

Before the description of the present invention proceeds, it should be noted that like parts are designated by like reference numerals throughout the accompanying drawings.

Figure 1:
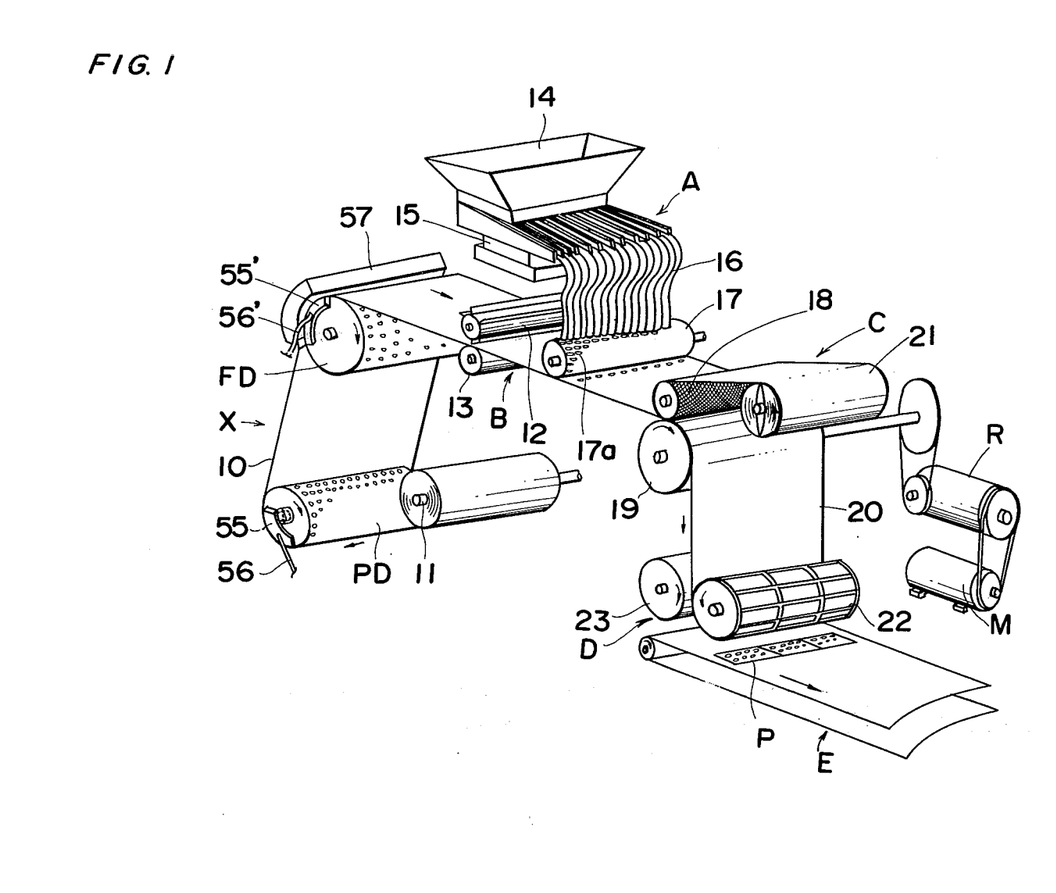
FIG. 1 is a schematic perspective view of a packaging machine of a continuous type for making blistered packages, to which a preferred embodiment of the present invention can be practised.

Referring first to FIG. 1, the packaging machine to which the present invention can be practised in one preferred form comprises a mold assembly, generally indicated by X and including a preforming drum PD and a finishing drum FD, both supported by any suitable framework (not shown) in spaced relation to each other for synchronous rotation at the same peripheral velocity. A web of thermoplastic resin film 10 from a supply roll 11, which is replaceably mounted to the framework and around which the thermoplastic resin film is coiled, is adapted to travel therefrom towards a product filling unit, as will be described later, first turning round the preforming drum PD and then around the finishing drum PD.

The continuously moving web of thermoplastic resin film 10 after having emerged from the mold assembly X and, more particularly, after having turned round and moved past the finishing drum FD, is formed with a plurality of blisters in a predetermined pattern corresponding to the arrangement of molds in the preforming and finishing drums PD and FD, each of which blisters is defined by a portion of the thermoplastic resin web 10 concaved, or otherwise recessed, from the remaining portion of said thermoplastic resin web 10.

Positioned preceding the product filling unit A is a rouletting unit B which includes a rouletting roll 12 and a rubber-lined, back-up roll 13 positioned therebelow, both of these rolls 12 and 13 being supported by the framework and arranged in position to sandwich the thermoplastic resin web 10 therebetween for making rows of slits or perforations in the thermoplastic resin web, each row of which represents a line of breakage along which the finished blistered package can be broken by hand.

The product filling unit A includes a hopper 14 for accommodating therein a mass of products to be packed, which hopper 14 includes a vibrator 15 for vibrating the hopper 14 to facilitate a supply of products therefrom towards a plurality of flexible feed tubes 16 each having one end coupled to a corresponding outlet at the bottom of the hopper 14. The product filling unit A further includes a transfer roll 17 supported by the framework for rotation about its own axis extending across the width of said thermoplastic resin web 10, which transfer roll 17 is formed on its outer peripheral surface with a plurality of recesses 17a arranged in the same pattern as that of arrangement of the molds in any of the preforming and finishing drums PD and FD. The other ends of the respective feed tubes 16 are bundled in a row and positioned immediately above the transfer roll 17 whereby as the transfer roll 17 is rotated in a direction conforming to the direction of movement of the thermoplastic resin web 10, a plurality of products from the respective feed tubes 16, which have been fed by gravity from the hopper 14, are successively received by said transfer roll 17 one for each recess 17a and then transferred onto the blisters in the thermoplastic resin web 10 passing beneath said transfer roll 17. It should be noted that, in order to avoid separation of some of the products from the associated recesses 17a in the transfer roll 17 during rotation of said roll 17 through approximately 180°, a curved guard (not shown) is provided on the leading side of the transfer roll 17 and in the vicinity of, or otherwise in sliding contact with, said roll 17.

The thermoplastic resin web 10, that has been transferred to the product filling unit A and after the products have individually been supplied into the respective blisters in the thermoplastic resin web 10, is then transferred through a sealing unit C onto a cutting unit D.

The sealing unit C includes a heating roll 18 having the outer peripheral surface finely serrated, and a back-up roll 19 positioned below said heating roll 18, these rolls 18 and 19 being rotatably supported by the framework. Wound around the heating roll 18 and joining the thermoplastic resin web 10 past the back-up roll 19 is a web of covering sheet 20, for example, an aluminum foil, fed from a supply roll 21, which covering sheet web 20 is heat-bonded to the back of the thermoplastic resin web 10 as it passes through and between the rolls 18 and 19 together with the thermoplastic resin web 10. At this time, the products within the respective blisters in the thermoplastic resin web 10 are completely concealed within said blisters.

The thermoplastic resin web 10 bonded with the covering sheet 20 with the product in said blister is then transferred to the cutting unit D which includes a cutter drum 22 and a rubber lined roll 23 in the vicinity of said drum 22, the drum 22 and roll 23 being rotatably supported by the framework following the sealing unit C. It will readily be seen that the cutter unit D operates in such a manner as to provide blistered packages, such as indicated by P, each containing a predetermined number of products, which are subsequently dropped by gravity onto a bent conveyor E in readiness for transference thereof to a subsequent processing station.

In the arrangement so far described, it should be noted that at least the drums and rolls, such as indicated by PD, FD, 12, 17, 18, 19 and 22, are all driven by an electrically operated motor M through a reduction gear box R and then through a suitable belt or chain arrangement (not shown, but a portion thereof connecting between the reduction gear box R and the roll 19 is only shown,) so as to rotate at the same peripheral velocity. In addition, the finishing drum FD and the back-up roll 19 should be arranged such as to permit a portion of the thermoplastic resin web therebetween to horizontally extend.

Figure 2:
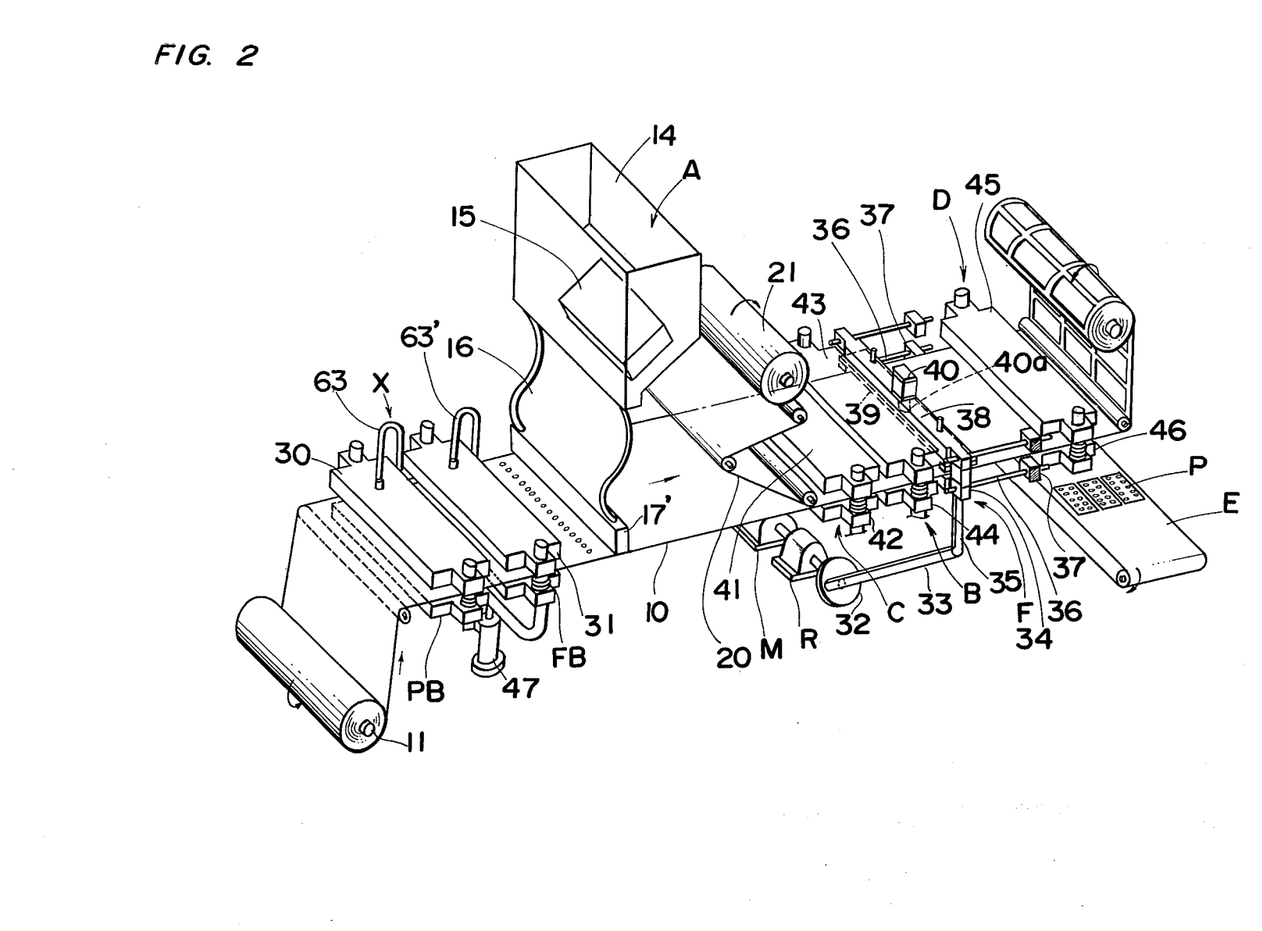
FIG. 2 is a schematic perspective view of a packaging machine of an intermittent type for making blistered packages, to which another preferred embodiment of the present invention can be practised.

Referring now to FIG. 2, the mold assembly X employed in the machine of the intermittent type includes a preforming mold unit composed of a preforming block PB and a pressure plate 30, and a finishing mold unit composed of a finishing block FB and a pressure plate 31, the details of which will be described later.

A web of thermoplastic resin film 10 is adapted to be intermittently transferred from the roll 11 in a direction indicated by the arrow through respective gaps between the preforming block PB and its associated pressure plate 30 and between the finishing block FB and its associated presser plate 31. For effecting the intermittent transference of the thermoplastic resin web 10, the packaging machine is provided with a web drawing mechanism, generally indicated by F, which will now be described.

The web drawing mechanism F comprises an electrically operated motor M coupled through the reduction gear box R to a motion translator for translating rotary motion into linear motion. The motion translator so far illustrated comprises a disc 32 mounted for rotation together with a power output shaft of the reduction gear box R, and a connecting rod 33 having one end pivotally connected to a portion of the disc 32 adjacent the periphery thereof.

The web drawing mechanism F further comprises a horizontally movable transverse bar 34 operatively coupled to the connecting rod 33 through a link 35 and supported on a pair of oppposed guides for sliding movement in a direction parallel to the direction of movement of the thermoplastic resin web 10, said guides 36 being supported in position by the framework through support blocks 37 which may form parts of the framework. Since the blisters in the thermoplastic resin web 10 being transferred are all downwardly projected, the transverse bar 34 is of a shape having both end portions supporting said thermoplastic resin web 10 and a substantially intermediate portion thereof spaced from said thermoplastic resin web 10 a distance greater than the height of each of the blisters. Extending above and across the thermoplastic resin web 10 is a support bar 38 having both ends connected to, or otherwise integrally formed with, the transverse bar 34 and supported by the framework in a similar fashion as the transverse bar 34. Within a space defined between the thermoplastic resin web 10 and the support bar 38, there is provided a presser bar 39 having both ends adapted to contact respective side portions of the thermoplastic resin web when said presser bar 39 is lowered close to the resin web 10 in such a manner as will now be described. It should be noted that a unit of the bars 34 and 38 is movable between first and second positions in a direction parallel to the direction of movement of the resin web 10, said unit assuming the first position in the condition as shown.

It will readily be seen that as the disc 32 is rotated in one direction, the connecting rod 33 moves in a substantially linear direction and the linear movement of said connecting rod 33 is subsequently transmitted to the unit of the bars 34 and 38, thereby causing the latter to move from the first position to the second position. Further rotation of the disc 32 to complete its 360° rotation causes the unit of the bars 34 and 38 to return from the second position to the first position.

A hydraulically operated cylinder 40 mounted on the support bar 38 and having a plunger 40a extending through said bar 38 and rigidly connected to the presser bar 39 is operated in such a manner that, when said unit of the bars 34 and 38 is moved from the first position to the second position, said presser bar 39 is lowered to clamp the resin web 10 in cooperation with that end portions of the transverse bar 34 and, when said unit of the bars 34 and 38 is moved from the second position to the first position, said presser bar 39 is upwardly shifted with its two ends clear of the thermoplastic resin web 10. Thus, it has now become clear that the thermopolastic resin web 10 can intermittently be transferred each time the disc 32 complete its 360° rotation.

The product filling unit A does not include the transfer roll such as employed in the machine of FIG. 1, and instead thereof, employs an elongated block 17' formed with a plurality of through holes (not shown) communicating to the flexible feed tubes 16. This elongated block 17' is supported by the framework in such a manner as to permit one side face to slidingly contact the back of the thermoplastic resin web 10.

The sealing unit C is arranged at a position following the product filling unit A and preceding the rouletting unit B which precedes the web drawing mechanism F. This sealing unit C includes a heating plate 41 having one finely serrated surface facing the thermoplastic resin web 10 and a movable back-up plate 42. The rouletting unit B includes a back-up plate 43 and a rouletting plate 44 and, similarly, the cutter unit D includes a back-up plate 45 and a movable cutting plate 46.

It should be noted that all of the plates 30, 31, 41, 43 and 45 are stationarily supported by the machine framework in such a manner that one surface of any of the plates, which faces the thermoplastic resin web 10 being transferred, lies in the same plate as that of the adjacent plates, while the plates PB, FB, 42, 44 and 46 are all supported by the machine framework for movement close to and away from the thermoplastic resin web 10. For this purpose, fluid operated cylinders, only one of which is shown by 47, corresponding in number to the number of the plates PB, FB, 42, 44 and 46, are provided. The employment of cylinders, one for the plates PB and FB, another one of the plates 42 and 44 and still another one for the plate 46, is also possible. In any event, all of these cylinders 47 are to be synchronously operated in such a manner that the plates PB, FB, 42, 44 and 46 are moved close to the thermoplastic resin web 10 only when the unit of the bars 36 and 34 is being moved from the second position to the first position and are moved away from the thermoplastic resin web 10 shortly before commencement of movement of the unit of the bars 34 and 38 from the first position towards the second position or in response to the lowering of the presser bar 39.

Reference numeral 48 indicates a take-up roll for winding up a scrap of the thermoplastic resin web which is left after the blistered packages P have been separated from the thermoplastic resin web by the cutter unit D.

Each of the mold assemblies according to the present invention, which are applicable to the machines of FIGS. 1 and 2, respectively, will now be described.

Figure 3:
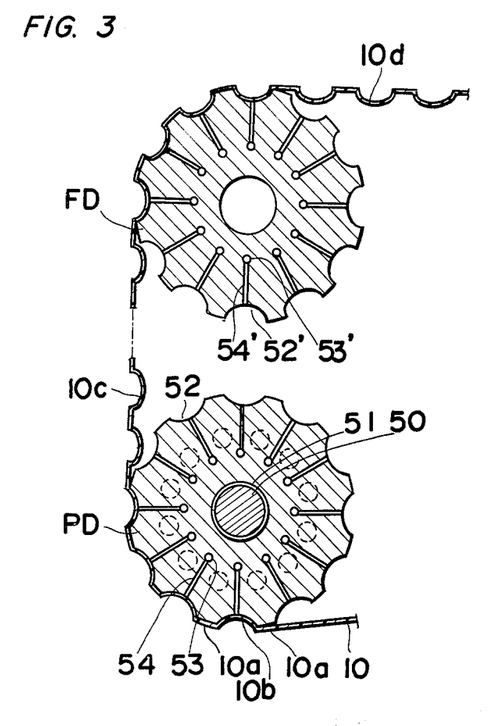
FIG. 3 is a schematic side sectional view of a mold assembly according to the present invention, which is utilized in the machine of FIG. 1.

Referring to FIG. 3, the preforming drum PD is shown as having an elongated cartridge-type heater 50 housed in an axial bore 51 formed in said drum PD. The heater 50 acts to heating the drum PD for the purpose as will be described later. As shown, the drum PD is formed on its outer peripheral surface with a plurality of rows of radially inwardly recessed molds, generally indicated by 52, which molds of the rows are circumferentially equally spaced from each other and which molds in each row are also equally spaced from each other in a lengthwise direction of the drum PD or in a widthwise direction of the thermoplastic resin web 10.

The preforming drum PD is also formed with a plurality of blind holes 53 extending in parallel relation to the axis of rotation of said drum PD and having open ends opening at one end face of said drum PD, which open ends are arranged in a substantially circular configuration radially equally spaced from the axis of rotation of the drum PD. Radially extending passages 54 formed in the preforming drum PD communicate the rows of the molds 52 to the respective blind holes 53.

The open ends of the holes 53 are adapted to be successively communicated to a source of vacuum (not shown) which may be a suction pump. For this purpose, as shown in FIG. 1, a curved block 55 is provided adjacent the end face of the drum PD where the open ends of the holes 53 are open. This curved block 55 has one surface formed with a curved groove (not shown) of a curvature sufficient to align with the common path of travel of the open ends of the holes 53 during rotation of the preforming drum PD, said groove being in turn communicated to the vacuum source through a suitable tubing 56. It is to be noted that the curved block 55 is supported in such a way as to be biased towards the preforming drum PD with the grooved surface in sliding contact with the adjacent end face of the drum PD. The actual length of the groove in the curved block 55 corresponds to that of a portion of the periphery of the drum PD which contacts the thermoplastic resin web 10 and, preferably, is such as to occupy not less than 90° of the circle along which the open ends of the holes 53 are located.

The position of the curved block 55 relative to the preforming drum PD is such that some of the molds 52 in the preforming drum PD, which are then covered with the thermoplastic resin web 10 being transferred, are communicated to the vacuum source through the groove in the curved block 55 via the tubing 56 (FIG. 1).

The finishing drum FD is constructed in a similar fashion to the preforming drum PD and, therefore, for the sake of brevity, similar structural elements of the finishing drum FD with respect to that of the preforming drum PD are designated by giving a prime (') to the respective reference numerals employed in association with the preforming drum PD. However, it should be noted that the finishing drum FD is not provided such a heater as indicated by 50 and employed in the preforming drum PD, but with an external heater 57 (FIG. 1) and that the depth of each of the molds 52' in the finishing drum FD is approximately twice the depth of any of the molds 52 in the preforming drum PD while the shape and area of the opening of each of said molds 52 and 52' remain the same.

In the mold assembly of the construction as hereinbefore described, upon immediate contact of the thermoplastic resin web 10 with the peripheral surface of the preforming drum PD which is then heated by the built-in heater 51 to, for example, 140°C., the thermoplastic resin web is softened to a pliable condition except for portions thereof which substantially overhang the respective molds 52 in the preforming drum PD, because that portion of the thermoplastic resin web 10 are, prior to contacting the individual bottoms of the molds 52, left unaffected by the temperature of the preforming drum PD as compared with the remaining portion of the thermoplastic resin web 10 which is substantially completely softened in direct contact with the peripheral surface of the preforming drum PD.

Each portion of the resin web 10 overhanging a corresponding one of the molds 52 is attracted towards the corresponding mold 52 by the effect of pressure differential created by the substantial vacuum present in the mold 52, thereby inwardly deforming towards the bottom of the corresponding mold 52 while a portion, as at 10a, of the thermoplastic resin web 10 which is in contact with the peripheral surface of the drum PD around said each of said portions of said web 10 is radially inwardly elongated in a greater amount than the amount of elongation of said each of said portions of the resin web 10. In FIG. 3, each of the portions of the resin web 10 thus inwardly deformed and subsequently shaped to fit to the shape of the corresponding mold 52 is designated by 10b.

From the foregoing, it will be readily seen that at the time of completion of the preforming process with the preforming drum PD, the thickness of each of the portions 10b of the resin web 10 remains greater than that of the remaining portion of the resin web 10. In this respect, if without employing the preforming drum the thermoplastic resin web is subjected to the final forming process, the thickness of the portions 10b would become equal to or less than that of the remaining portion of the resin web, which is not desirable.

The thermoplastic resin web 10 past the preforming drum PD is observable as formed with preformed blisters, generally indicated by 10c. The preformed blisters 10c are subsequently shaped by the finishing drum FD to represent the predetermined or desired shape which is similar to the shape of the preformed blister.

Structurally, the finishing drum FD is substantially identical with the preforming drum PD except that the depth of each of the molds 52' in the finishing drum FD is about twice the depth of the mold 52 in the preforming drum PD and that the heater 57 is positioned externally of the finishing drum FD. It is to be noted that the heater 57 is preferably of a type capable of radiating far-infrared rays and is arranged relative to the finishing drum FD such as to direct the far-infrared rays towards a portion of the finishing drum FD where the thermoplastic resin web 10 having preformed blisters 10c engages thereto.

The thermoplastic resin web 10 having the preformed blisters 10c engaged in the respective molds 52' is, during the final forming process, heated uniformly by the far-infrared rays emitted from the heater 57. Therefore, before being set to the final shape, the bottom portion of each of the preformed blisters 10c, which has not been elongated during the thermoplastic resin web, is in effect elongated radially outwardly as the preformed blisters 10c are drawn towards the respective molds 52' in the finishing drum FD by the effect of pressure differential created by the substantial vacuum present in these molds 52' then communicated though the groove (not shown) in the block 55' via a tubing 56' to a source of vacuum which may be the one leading to the molds 52 in the preforming drum PD through the tubing 56.

At the time and after the resin web 10 with the individual blisters completely shaped by the finishing drum FD has emerged past the finishing drum FD, the formed blisters, as at 10d, are permanently set to the final shape in contact with the ambient air.

According to a series of experiments conducted by the inventors with the use of a web of polyvinyl chloride of a thickness of 130 $\mu$, the dimensions of any of the formed blisters 10d were found such as tabulated below when the dimensions of the corresponding preformed blister 10b were as tabulated below.

the wall portion of the preformed blisters 10c ready to engage in the respective molds 52' decreases and, at this time, the temperature of the bottom portion of the preformed blisters 10c remains heated by the heater 57. A similar heat exchange occurs in the remaining portion of the resin web 10b other than the blisters 10c. Consequently, it may be said that, during the final forming process, only the bottom portions of the individual preformed blisters are substantially elongated radially outwardly, reducing the thickness thereof to a value substantially equal to or slightly smaller than the wall thickness of the subsequently finished blisters 10d.

Figure 4:
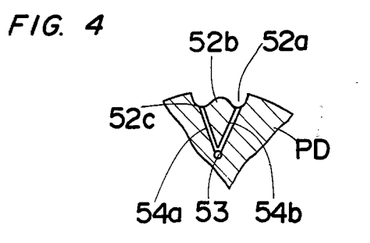
FIG. 4 is a fragmental side sectional view, on an enlarged scale, of a portion of a preforming drum of the mold assembly, showing a modification of one of the molds formed in the preforming drum.

So far as the preforming drum PD is concerned, each of the molds 52 may be shaped such as shown in FIG. 4. The mold 52a of FIG. 4 has its bottom portion radially outwardly convexed to provide a projected portion 52b having a relatively great radius of rounding. In the case where the preforming drum PD having the molds 52a of the shape as shown in FIG. 4 is employed, the preforming drum PD should not incorporate the heater 51, but should employ an external heater which is structurally similar to the heater 57 and which is also to be arranged in a similar fashion to the heater 57 relative to the preforming drum PD. This is because each of the projected portions 52b in the respective molds 52a acts to cool the substantial center of the corresponding portion of the thermoplastic resin web 10 which may subsequently be formed into a preformed blister 10b, upon contact thereof with said projected portion 52b. More specifically, since the heater for the preforming drum PD having the molds 52a shown in FIG. 4 is positioned externally of the preforming drum PD, the thermoplastic resin web including that portions thereof to be formed into the preformed blisters is softened and, therefore, if the projected portions 52b are not provided, the thickness of the resultant blisters at the bottom would become excessively small. This is avoided by causing the center of the corresponding portion of the thermoplastic resin web 10, which is subsequently formed into a preformed blister, to contact said projected portion 52b thereby to render it cooled to a temperature lower than the other portion around 52b which is not in contact with the mold wall and peripheral surface of the drum PD.

To achieve the above effect, at least two suction passages 54a and 54b are necessary, each having one

| Dimensions of Preformed Blister | | Dimensions of Formed Blister | |
|---|---|---|---|
| Wall Thickness: | 70 to 80 $\mu$ | Wall Thickness: | 60 to 70 $\mu$ |
| Bottom Thickness: | 130 $\mu$ | Bottom Thickness: | 50 to 60 $\mu$ |
| Thickness at 10a: | 100 to 120 $\mu$ | Thickness at 10a: | 90 to 100 $\mu$ |

From the above table, it is clear that each of the formed or finished blisters 10d has a substantially uniform thickness at all points.

More specifically, during the final forming process with the finishing drum FD, the thermoplastic resin web 10 having the preformed blisters 10c is engaged with the finishing drum FD in such a manner that, while the resin web 10 with the blisters 10c is heated by the heater 57, the wall portions of each of the preformed blisters 10c first contacts a corresponding wall portion of the associated mold 52'. upon contact of the wall portion of the preformed blisters 10c to the corresponding wall portion of the molds 52', heat exchange takes place therebetween so that the temperature of end in communication with the corresponding blind hole 53 and the other end opening at the annular bottom, as at 52c, of the corresponding mold 52a. Preferably, that ends of the respective passages 54a and 54b open at the annular bottom 52c are spaced 180° apart from each other.

In addition, it is preferred that the level of the top of the projected portion 52b in each of the molds 52a is below the level of the peripheral surface of the drum PD, more preferably, approximately half the depth of the mold 52a, which depth is defined as a distance between any point on the annular bottom 52c and the plane of the peripheral surface of the drum PD.

The radius of rounding of each of the projected portions 52b is preferably selected such that the surface area of the corresponding mold 52a is substantially equal to the surface area of any of the molds 52' in the finishing drum FD as shown in FIG. 3.

The heater 50 may be omitted, in which case a plurality of heaters of a cartridge type may be inserted or embedded in the preforming drum PD in such a manner as indicated by broken circles in FIG. 3. If this arrangement is employed, an annular electroconductive brush element would be necessitated to supply electric power to the heaters while the drum PD is rotated.

Figure 5:
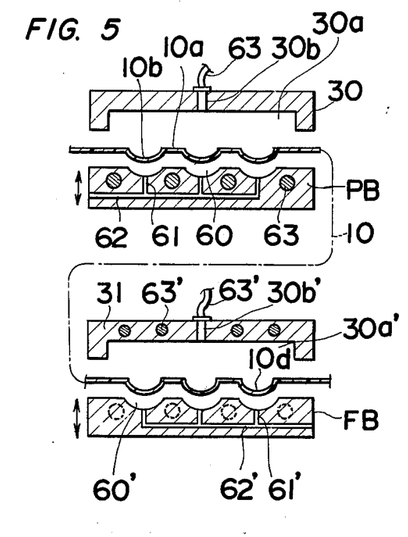
FIG. 5 is a schematic side sectional view of a mold assembly according to the present invention, which is utilized in the machine of FIG. 2.

With reference to FIG. 5, the mold assembly which can be advantageously applicable in the machine of FIG. 2 is illustrated in detail. The preforming block PB is employed in the form of a rigid plate having one surface formed with a plurality of rows of inwardly recessed molds, generally indicated by 60 and only one row of three molds of which is shown by way of example. These molds 60 are communicated to the atmosphere through vent passages 61, each having one end open at the bottom of the corresponding mold 60 and the other end in communication with a corresponding blind hole 62, said passages 60 and said blind hole 62 being both formed in said preforming block PB. The opening of each of the blind holes 62 is in communication with the atmosphere through a suitable tubing (not shown) which may not be employed. A plurality of heaters 63, each being of a cartridge type, are embedded, or otherwise inserted, in the preforming block PB. As described hereinbefore with reference to FIG. 2, this preforming block PB is supported in position for movement close to and away from the associated presser plate 30.

The presser plate 30 has one surface recessed to provide a square-walled cavity 30a facing towards the molds 60 in the preforming block PB. The pressure plate 30 is formed with at least one through hole 30b having one end communicated to a source of compressed air through a suitable tubing 63 and the other end opening into said cavity 30a.

The finishing block FB including the pressure plate 31 is substantially identical with the preforming block PB including the pressure plate 30 and, therefore, like elements are designated by the like reference numerals given with a prime ('). However, in the finishing block PB, though the heaters 63 have been described as provided in the preforming block PB, heaters 63' are to be embedded, or otherwise inserted, in the presser plate 31.

In the mold assembly of FIG. 5, it will readily be seen that, upon simultaneous movement of the preforming and finishing blocks PB and FB close to the respective plates 30 and 31 with the cavities 30a and +a' substantially hermetically sealed and subsequent application of compressed air into the associated cavities 30a and 30a', preformed blisters 10b and formed or finished blisters 10d are respectively successively formed in the thermoplastic resin web 10. It is to be noted that, although the blind holes 62 and 62' have been described as leading to the atmosphere, they may be communicated with a common source of vacuum, which may be a vacuum pump, in which case no through hole 30b and 30b' and their associated tubings 63 and 63' are necessary and the blocks PB and FB may not be movable. Moreover, a plurality of cooling water jackets may be provided in the finishing block FB as shown by broken circles for forcibly cooling the finishing block FB to facilitate reduction of the thickness at the bottom of each of the preformed blisters during the final forming process.

Considering the individual molds 60 and 60', a substantially similar reasoning as to the formation of the blisters and the design requirements of said molds 60 and 60', which has hereinbefore been set forth in connection with the mold assembly with reference to FIG. 3, can equally be applicable to the mold assembly of FIG. 5.

Figure 6:
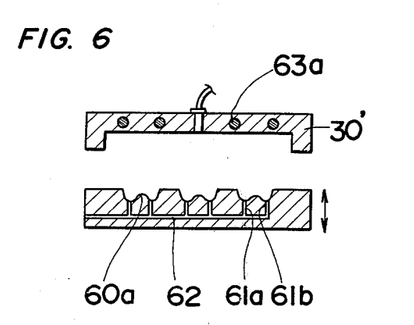
FIG. 6 is a schematic side sectional view of a preforming block of the mold assembly of FIG. 5, showing a modification thereof.

FIG. 6 illustrates a modification of the preforming block PB of the mold assembly of FIG. 5. The preforming block PB of FIG. 6 differs from that of FIG. 5 in that each of the molds 60 is provided with a projected portion 60a and it is in communication with the blind hole 62 through at least two vent passages 61a and 61b. In other words, FIG. 6 illustrates an example where the design of the mold shown in FIG. 4 is applied to the preforming block PB. It is to be noted that, in the case where the preforming block PB of the construction of FIG. 6 is employed, the pressure plate 30' should have heaters 63a embedded, or otherwise inserted, in said pressure plate 30', for the same reason as hereinbefore described in conjunction with the preforming drum PD of the construction of FIG. 4.

According to a series of experiments conducted by the inventors with the mold assembly wherein the preforming block PB is of the construction as shown in FIG. 6 and the finishing block FB of the construction as shown in FIG. 5, it has been found that any of the preformed blisters 10c had the smallest thickness of 130 $\mu$ while the corresponding finished blister 10d had the smallest thickness of 50 to 60 $\mu$, with respect to the original thermoplastic resin web of 130 $\mu$ made of polyvinyl chloride. This result is comparable with that available from a thermoplastic resin web of 200 $\mu$ in thickness by the use of the conventional device.

Although the present invention has been fully described in connection with the preferred embodiments thereof, it should be noted that various changes and modifications are apparent to those skilled in the art. For example, the number of the molds in any of the preforming and finishing drums or blocks should not be limited to as shown. Therefore, such changes and modifications should be construed as included within the scope of the present invention unless they depart therefrom.

We claim:

1. A mold assembly for use in a blistered package making machine for forming a plurality of blisters in a web of thermoplastic resin film, said mold assembly comprising a first rigid structure; a plurality of preforming molds formed in said first rigid structure; heating means for heating the thermoplastic resin web, passing over said preforming molds, to a soft, pliable condition; means for causing portions of said thermoplastic resin web, which overhang said preforming molds, to deform to provide preformed blisters seating within said respective preforming molds while the remaining portion of said thermoplastic resin web is substantially elongated; a second rigid structure; a plurality of finishing molds formed in said second rigid structure, said finishing molds being arranged in the same pattern as said preforming molds; heating means for heating the thermoplastic resin web which has been formed with said preformed blisters; and means for causing said preformed blisters under heated condition to deform to provide the corresponding finally formed blisters seating within said respective finishing molds in such a way as to elongate the bottom of each of said preformed blisters radially outwardly.

2. A mold assembly as recited in claim 1, wherein said first and second rigid structures are preforming and finishing drums supported in spaced relation to each other for rotation in the same direction and wherein said preforming and finishing molds are respectively formed in the individual peripheral surfaces of said preforming and finishing drums.

3. A mold assembly as recited in claim 2, wherein each of said preforming molds has a depth substantially half the depth of any of said finishing molds.

4. A mold assembly as recited in claim 2, wherein said first mentioned heating means is carried by said preforming drum and wherein said second mentioned heating means is a heater capable of radiating far infrared rays and positioned externally of said finishing drum and in the vicinity thereof.

5. A mold assembly as recited in claim 2, wherein said first and second mentioned heating means are heaters each capable of radiating far infrared rays and positioned externally of and in the vicinity of said preforming and finishing drums, respectively.

6. A mold assembly as recited in claim 5, wherein each of said preforming molds has a projected portion radially outwardly formed at the bottom thereof for facilitating cooling of the substantial center of each of the portions of the thermoplastic resin web which are subsequently formed into the preformed blisters.

7. A mold assembly as recited in claim 6, wherein said projected portion has a relatively great radius of rounding and the level of the top thereof is substantially below the plane of the peripheral surface of said preforming drum.

8. A mold assembly as recited in claim 1, wherein said first and second rigid structures are preforming and finishing blocks each being of a plate-like shape and further comprising pressure plates, one for each of said preforming and finishing blocks, said pressure plates being positioned above said respective preforming and finishing blocks, said preforming and finishing molds being formed in one surface of said respective preforming and finishing blocks which faces towards the respective presser plates.

9. A mold assembly as recited in claim 8, wherein each of said preforming molds has a depth substantially half the depth of any of said finishing molds.

10. A mold assembly as recited in claim 8, wherein said preforming and finishing blocks are supported for simultaneous movement close to and away from said respective pressure plates while the thermoplastic resin web is adapted to be transferred through individual gaps between said blocks and said pressure plates.

11. A mold assembly as recited in claim 10, wherein each of said preforming molds has a depth substantially half the depth of any of said finishing molds.

12. A mold assembly as recited in claim 10, wherein said first mentioned heating means is carried by said preforming block and wherein said second mentioned heating means is carried by said pressure plate associated with said finishing block.

13. A mold assembly as recited in claim 11, wherein said first and second mentioned heating means are carried by said pressure plates, respectively.

14. A mold assembly as recited in claim 8, wherein each of said preforming molds has a projected portion radially outwardly formed at the bottom thereof for facilitating cooling of the substantial center of each of that portions of the thermoplastic resin web which are subsequently formed into the preformed blisters.

15. A mold assembly as recited in claim 14, wherein said projected portion has a relatively great radius of rounding and the level of the top thereof is substantially below the plane of the peripheral surface of said preforming drum.

16. A mold assembly as recited in claim 15, wherein said level of said top of said projected postion is located at a position corresponding to half the depth of the respective preforming mold.

* * * * *